Nov. 2, 1926 Re. 16,451
A. W. BRUCE
LOCOMOTIVE TRAILING TRUCK
Original Filed Sept. 20, 1924 2 Sheets-Sheet 1
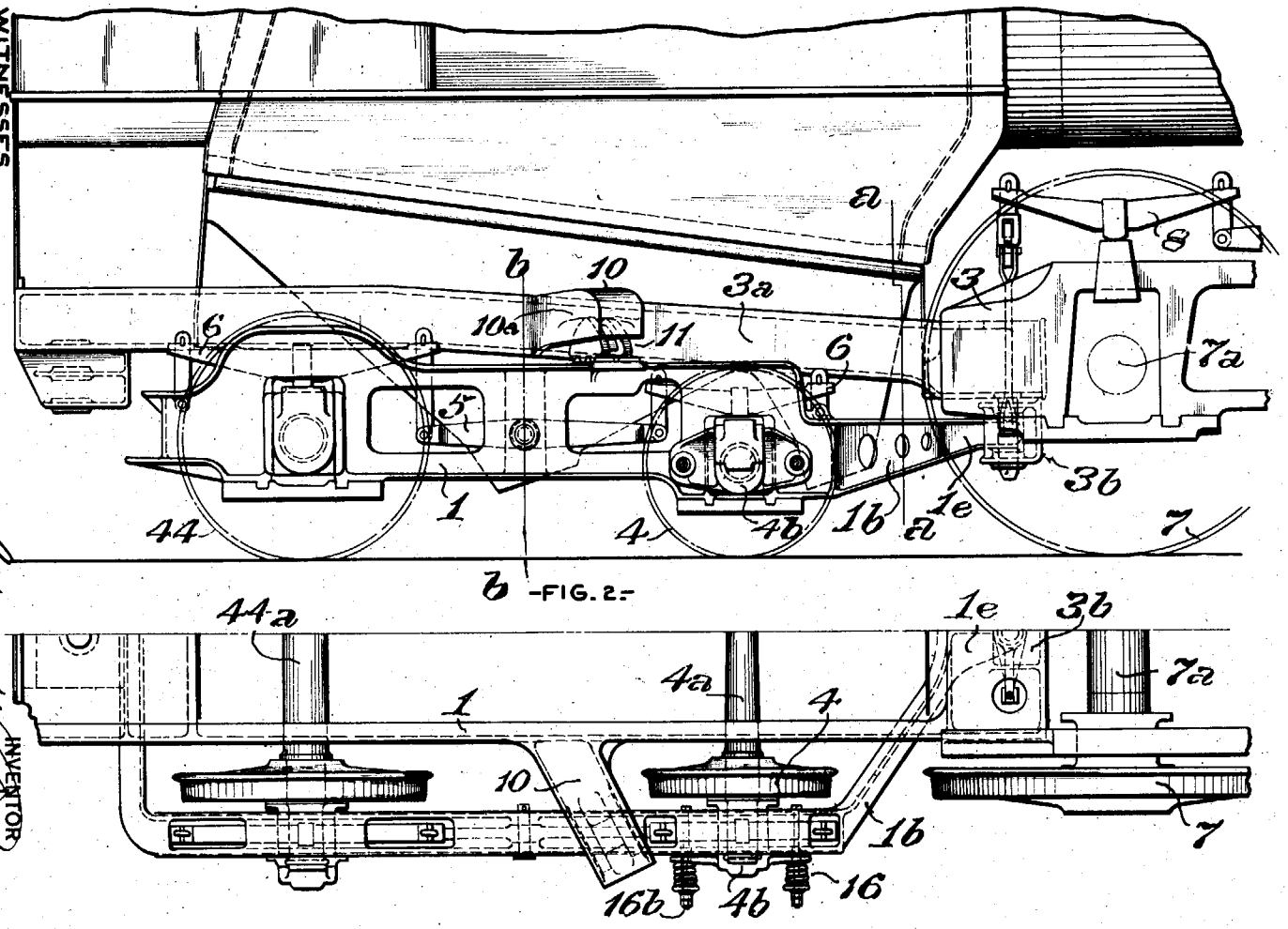
WITNESSES
A. S. Vanderbilt
S. R. Bell
INVENTOR
Alfred W. Bruce,
by J. Warden Dell,
Atty.
PHOTO-LITHO. by SACKETT & WILHELMS CORP. N.Y.

Nov. 2, 1926. Re. 16,451
A. W. BRUCE
LOCOMOTIVE TRAILING TRUCK
Original Filed Sept. 20, 1924 2 Sheets-Sheet 2
-FIG. 3.-
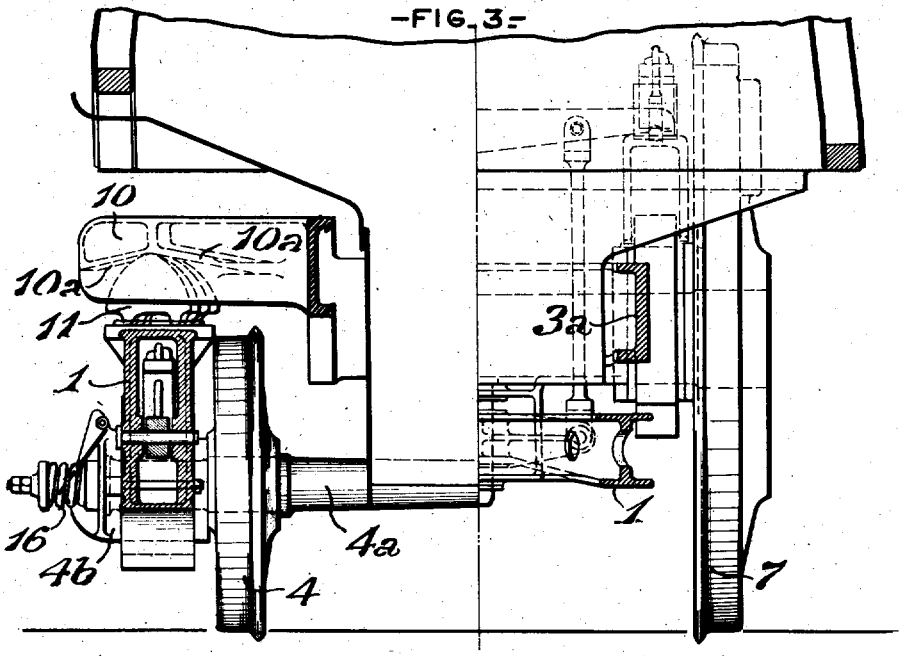
-FIG. 4.-
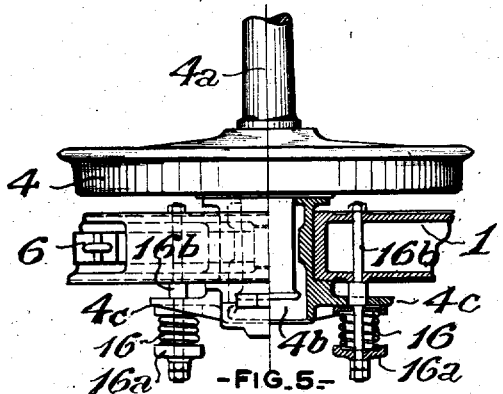
-FIG. 5.-
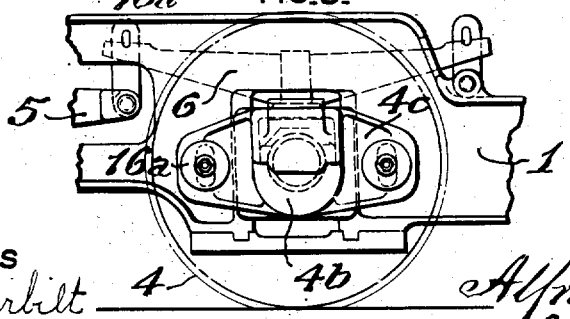
WITNESSES
A. J. Vanderbilt
S. R. Bell
INVENTOR
Alfred W. Bruce,
By J. Nowden Bell
Atty.

Reissued Nov. 2, 1926.

Re. 16,451

UNITED STATES PATENT OFFICE.

ALFRED W. BRUCE, OF NEW YORK, N. Y.

LOCOMOTIVE TRAILING TRUCK.

Original No. 1,529,986, dated March 17, 1925, Serial No. 738,822, filed September 20, 1924. Application for reissue filed August 31, 1926. Serial No. 132,848.

The object of my invention is to provide a four wheeled trailing truck, which shall be of strong and simple design; ready applicability below the firebox of a locomotive boiler; capacity for supporting a booster or analogous device, in the usual manner; and which, in passing curves, shall operate similarly to a two-wheeled truck, the two additional wheels having a supporting function only, and exerting no influence on the tracking of the truck as a whole.

The improvement claimed is hereinafter fully set forth.

In the accompanying drawings: Figure 1 is a side view, in elevation, of the rear portion of a locomotive engine, illustrating an embodiment of my invention; Fig. 2, a half plan view, with the firebox removed; Fig. 3, a vertical transverse section, the right hand and left hand halves of which are taken on the lines *a a* and *b b*, respectively, of Fig. 1; Fig. 4, a half plan view, partly in section of the front axle and adjoining side frame member; and, Fig. 5, a side view, in elevation, of the same.

In the practice of my invention, referring descriptively to the specific embodiment thereof which is herein exemplified, the truck frame is an integral casting, comprising two parallel side members, 1, 1, a transverse rear member, $1^a$, connecting the side members; and a forwardly and inwardly inclined front member, $1^b$, extending from the side members to the longitudinal central plane of the truck, and having a forwardly projecting radius bar, $1^e$, at its middle, socketed to receive a centre pin. The radius bar is coupled by a centre pin, in the usual manner, to a cross tie, $3^b$, secured to the side member, 3, of the main frame of the locomotive and to the supplemental frame members, $3^a$, which extend rearwardly therefrom, above the truck frame.

The truck is supported on a pair of truck wheels, 4, which are fixed on a forward supporting truck axle, $4^a$, journalled in axle boxes, $4^b$, fitted in the side members of the frame, adjacent to their forward ends, and on a pair of truck wheels, 44, of larger diameter, which are fixed on a rear guiding truck axle $44^a$, of larger diameter than the supporting truck axle, the guiding truck axle, $44^a$, being journalled in the side members of the frame adjacent to their rear ends.

As clearly shown in Figs. 4 and 5, the supporting axle, $4^a$, is mounted in the truck frame with the capacity of lateral movement relatively thereto. Various devices for affording such lateral movement are known in the art, and any suitable and preferred form may be applied, in the discretion of the constructor. In the instance herein shown, the supporting axle, $4^a$, rotates in axle boxes, $4^b$, the bearing length of which is sufficiently greater than the width of the frame pedestals, to afford the desired and determined degree of lateral motion. Pressure, resisting outward movement of the axle, $4^a$, in either direction, is exerted upon the axle boxes, $4^b$, by helical spring, 16, coiled on stems, $16^b$, fixed in the side frame members, and bearing, at one end, on flanges, $4^c$, on the axle boxes, adjacent to their outer ends, and, at the other, on bearing plates, $16^a$, secured adjustably on the stems, $16^b$. The rear guiding axle, $44^a$, is, as in ordinary practice, allowed a limited degree of lateral motion, which, as indicated in the drawings, is lesser in degree than that of the front axle, $4^a$.

The proportion of the weight of the locomotive which is carried by the truck is transmitted from the supplemental main frame members, $3^a$, to the side members, 1, 1, of the truck frame, through any suitable and preferred device for permitting and controlling swinging movement of the truck, different types of which are known to constructors of locomotives. In the instance exemplified, the transmission of weight is effected through transmission arms, 10, formed on, or fixed to, the supplemental frame members, $3^a$, and projecting outwardly therefrom, at a forward inclination, in a suitably determined location in rear of the supporting truck axle, 4. Reversely inclined bearing faces, $10^a$, on the transmission arms, abut on rockers, 11, which are fitted to swing on the side members, 1, 1, of the truck frame, the relation of the bearing faces and rockers opposing the resistance to lateral movement which is requisite to permit and control the swinging movements of the truck in a manner well known in practice.

The weight carried by the truck frame acts upon the axle boxes, through springs, 6, bearing thereon, and coupled by intermediate truck equalizers, 5, pivoted on the side members of the truck frame, the opposite ends of the springs being linked to the side members by spring hangers. The rear driving wheels, 7, of the locomotive, are fixed on an axle, $7^a$, which is fitted in boxes in the main frame, 3, in the ordinary manner, the supported weight being transmitted to the driving boxes through springs, 8. The truck, as a whole, is equalized with the rear driving wheels, in a manner known in the art.

My invention attains, in practice, the substantial advantage of increasing the carrying capacity of a trailing truck above that of a two wheeled truck, by the application of an additional axle and pair of wheels, while maintaining the same tracking action, in passing over curved track, as that of a two wheeled truck, for the reason that the forward axle and wheels, being afforded lateral motion, perform a supporting function only, and the tracking of the truck, as a whole, is effected by the rear guiding axle and wheels, which are preferably, as shown, made of larger diameter to be better adapted to the performance of their guiding function.

I claim as my invention and desire to secure by Letters Patent:

1. In a locomotive engine, the combination of a trailing truck frame; a forward supporting axle and wheels; and a rear tracking axle and wheels, said axles being journalled in the frame with different degrees, relatively, of lateral motion.

2. In a locomotive engine, the combination of a trailing truck frame; a forward supporting axle and wheels, journalled, with the capacity of lateral motion, in said frame; and a rear tracking axle and wheels, journalled, with a lesser degree of lateral motion than the supporting axle and wheels, in said frame.

3. In a locomotive engine, the combination of a trailing truck frame; a forward supporting axle and wheels, journalled therein; a lateral motion device, operative on said forward axle; and a rear tracking axle and wheels, journalled in the truck frame.

4. In a locomotive engine, the combination of a trailing truck frame; a forward supporting axle and wheels, journalled therein; a lateral motion device, operative on said forward axle; and a rear tracking axle and wheels, of greater diameter than the supporting axle and wheels, journalled in the truck frame.

5. In a locomotive engine, the combination of a trailing truck frame; a forward supporting axle and wheels; axle boxes fitted in said frame, in which said axle is journalled with the capacity of lateral motion; springs, bearing on said axle boxes and on the truck frame; and a rear tracking axle and wheels, journalled in the truck frame.

6. In a locomotive engine, the combination of a main frame; a truck frame, pivotally connected thereto; means, interposed between the main frame and the truck frame, for permitting and controlling relative lateral movement of the latter; a forward supporting axle and wheels, journalled in the truck frame; a lateral motion device, operative on said forward axle; and a rear tracking axle and wheels, journalled in the truck frame.

ALFRED W. BRUCE.